United States Patent [19]

Lagin et al.

[11] Patent Number: 4,677,654
[45] Date of Patent: Jun. 30, 1987

[54] CARRYING CASE FOR CELLULAR TELEPHONE UNIT

[76] Inventors: Steven R. Lagin, 1108 Laurel Way, Beverly Hills, Calif. 90210; Jose L. Pardo, 10816 Ayres Ave., Los Angeles, Calif. 90064

[21] Appl. No.: 753,116

[22] Filed: Jul. 9, 1985

[51] Int. Cl.⁴ ............................................. H04B 1/40
[52] U.S. Cl. .................................... 379/58; 379/437; 379/59; 455/90; 455/89
[58] Field of Search ................ 179/2 EA, 2 E, 2 EB; 455/11, 18, 33, 54, 58, 89, 74, 90, 97, 128, 351, 344–349; 379/58, 56, 440, 428, 451, 457; 200/305; 190/900, 901, 902; 312/7.1, 7.2; 128/760

[56] References Cited

U.S. PATENT DOCUMENTS

| | | | |
|---|---|---|---|
| 2,574,167 | 11/1951 | Breisch | 455/89 |
| 2,855,257 | 10/1958 | Barker et al. | 312/7.1 |
| 2,935,606 | 5/1960 | Harrison et al. | 455/89 |
| 2,984,740 | 5/1961 | Madland et al. | 455/89 |
| 3,723,876 | 3/1973 | Seaborn, Jr. | 455/11 |
| 3,824,465 | 7/1974 | Blough | 455/89 |
| 3,846,396 | 12/1970 | Marchesi et al. | 179/100 |
| 4,056,696 | 11/1977 | Meyerle et al. | 179/100 R |
| 4,102,332 | 7/1978 | Gessman | 128/700 |
| 4,232,390 | 11/1980 | McEvilly, Jr. | 455/77 |

OTHER PUBLICATIONS

Scope Catalog, May 1985, p. 6.
Sharper Image Catalog, May 1985, pp. 6 & 7.

*Primary Examiner*—Robert Lev
*Attorney, Agent, or Firm*—Mitchell B. Wasson; Martin P. Hoffman; Charles W. Fallow

[57] ABSTRACT

A carrying case for a cellular telephone unit which would facilitate the portability of the telephone. The carrying case is relatively compact in nature and the interior of the case is provided with a cover and a plurality of specially designed brackets to conceal and/or anchor the cellular telephone unit consisting primarily of a transceiver, a battery and battery charging circuit, and a handset.

12 Claims, 5 Drawing Figures

CARRYING CASE FOR CELLULAR TELEPHONE UNIT

BACKGROUND OF THE INVENTION

During the last several years, we have witnessed incredibly rapid advances in both the information processing and telecommunications industry. These advances have shortened the time for various communications to be relayed between individuals and companies from several days to several seconds. Since many business decisions must be made upon the immediate receipt of information received via these technological improvements in the communications industry, various portable telecommunication systems were developed to insure that corporate executives, sales people, real estate agents and the like can immediately be contacted via a telephone system when they are not in their respective offices.

Until quite recently, the most popular form of communications using a portable telephone was the so-called mobile telephone system. According to this system, a city or region covered by this system is provided with a relatively few number of antennas. An individual who wishes to utilize this system must contact the operator which is associated with each antenna. This system proved quite unwieldy since the individual must be relatively close to one of the antennas to initiate the call with the operator and to sustain it with the called party. Additionally, according to its design, this system could accommodate only a relatively few simultaneously placed telephone calls.

Very recently, the Federal Communications Commission has approved the implementation and utilization of a new portable telecommunications system known as the cellular telephone system. Each city or region which utilizes this system would install a large number of antennas strategically placed throughout the area. These antennas would be designed such that a relatively large number of communications could occur at the same time. Additionally, if one or both of the parties utilizing the cellular telephone system would be in transit during the time of the communication, the communication would be automatically transferred to adjacent antennas as the individual or individuals move through the region. Therefore, this system is a marked improvement upon the standard mobile telecommunications system in that operator assistance is not necessitated, a large number of calls may be simultaneously placed and the entire city or region is blanketed with a relatively large number of antennas. This cellular system is presently in operation in such cities as Chicago, Illinois and Washington, D.C. and it is envisioned that in the immediate future, virtually all substantial metropolitan areas or regions will have access to such a system.

Due to its portability, the obvious use of the cellular telecommunication system would be by individuals travelling in their automobiles. Although the telephone transceivers which would be utilized in such a system could be permanently installed in each individual's automobile, due to the relatively expensive nature of such equipment and the problem of crime endemic to all metropolitan areas, such an installation would not be a wise idea. Consequently, it has been suggested that rather than to permanently install the cellular telephone into an automobile, the present invention describes a means for providing this telephonic equipment within a carrying means such as an attache case or a briefcase in order to overcome the problems delineated hereinabove. Furthermore, a cellular system provided in a portable carrying case would allow the individual to utilize the system even when he is not travelling in his automobile and is instead in a hotel room, a client's office or the like.

DESCRIPTION OF THE PRIOR ART

The prior art is replete with various electrical devices provided within article carrying cases such as briefcases and suitcases. Typical of these prior art devices are those described in U.S. Pat. No.4,132,295 issued to Hochfelsen; U.S. Pat. No. 2,486,536 issued to Olson; U.S. Pat. No. 2,328,012 issued to Hamilton; and U.S. Pat. No. 1,584,220 issued to Farkouh.

The patent to Hochfelsen describes an article carrying case in which a citizen's band radio unit and a recording device such as a dictating unit, or the like is provided within a briefcase. A hinge is attached to the particular article which is provided in the carrying case which would allow the article to be carried within the case and when the use of such an article is necessitated, it would be swung out of the interior of the case and would then be supported by the top surface of the carrying case.

The patents to Olson, Hamilton and Farkouh describe various suitcases or other portable travelling cases within which a radio receiver can be transported. These patents, along with the patent to Hochfelsen, do not address themselves to portable cellular telephone units and the attendant problems of fixably anchoring the various components of the telephone system within the carrying case. Due to the relatively high cost and sensitivitiy of a cellular telephone unit, it was of paramount importance that a carrying case be developed in which the transceiver, battery charger and telephone handset of the cellular telephone unit be fixedly mounted within the carrying case to minimize or eliminate damage caused by a physical shock or blow to the carrying case as well as being water resistant and shielding the components from various environmental problems such as dust and dirt.

SUMMARY OF THE INVENTION

In order to overcome the problems associated with the prior art, the present invention is directed to a compact carrying case which is adapted to house a cellular telephone system including a transceiver, a battery charger and a telephone handset. A plurality of brackets are physically affixed to the interior of the carrying case. These brackets form a support for the components of the cellular telephone unit. Additionally, the components are fixedly attached to the brackets so that the components, with the exception of the telephone handset, remain immobile at all times. A cover is provided for concealing the transceiver and the battery charger. A portion of the cover is hinged to allow access to various indicators and fuses. Provision is made for the accessability of a volume control switch and an on/off switch for controlling the telephone handset provided direction on the cover surface. The battery is charged through an external power source such as an automobile cigarette lighter, or due to its portability, through a standard wall socket.

Additional advantages and objects of the present invention will become apparent from the following detailed description, reference being made to the accompanying drawings.

DESCRIPTION OF THE PREFERRED EMBODIMENT

Figure 1:
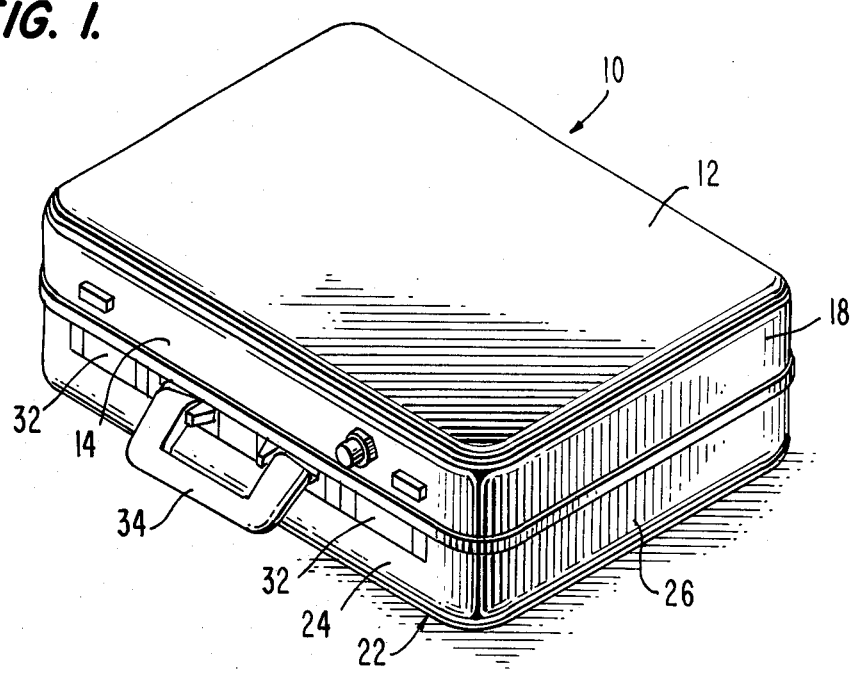
FIG. 1 is a perspective view of the carrying case in the closed position.
Figure 3:
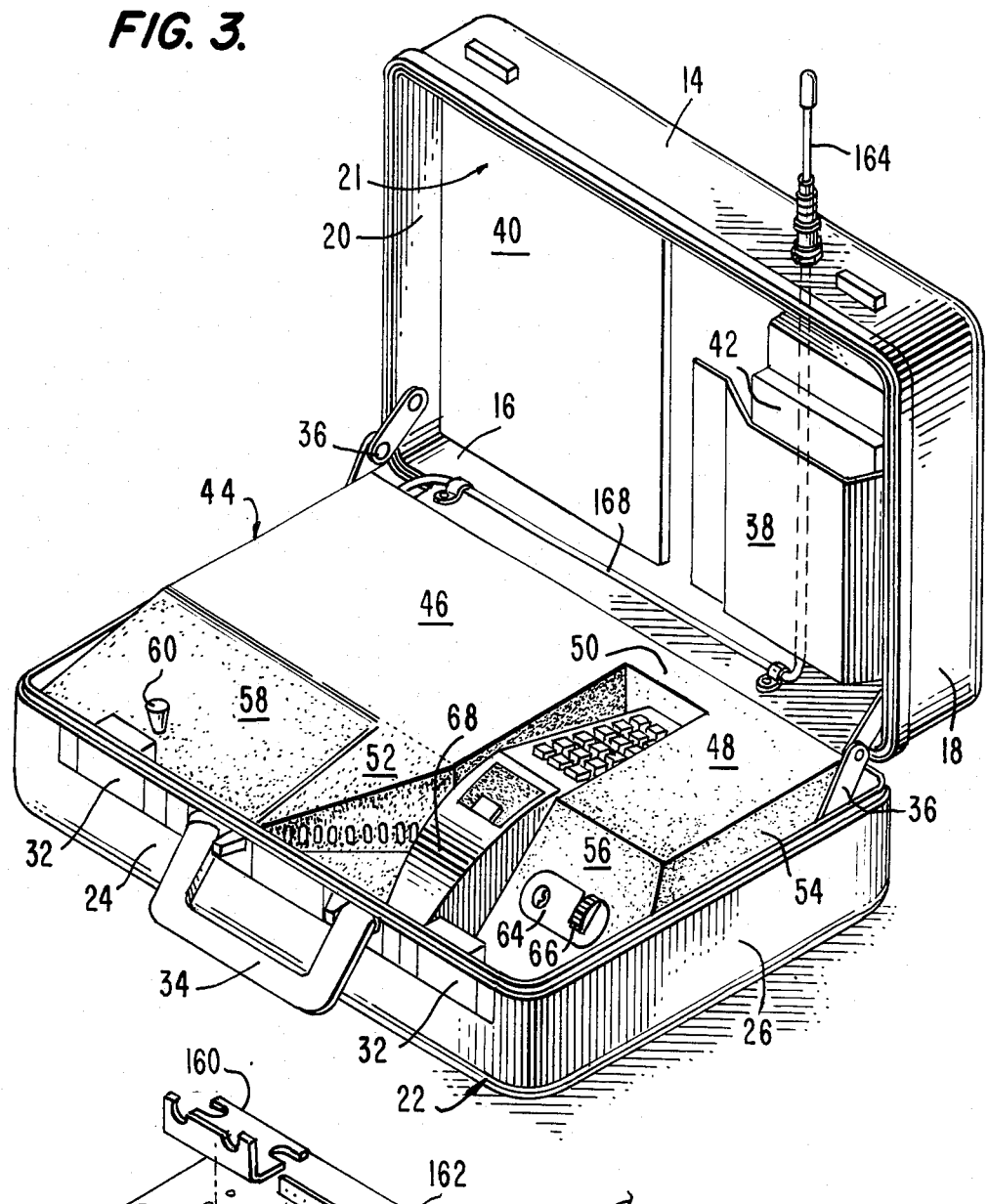
FIG. 3 is a perspective view of the carrying case in its opened position.
Figure 4:
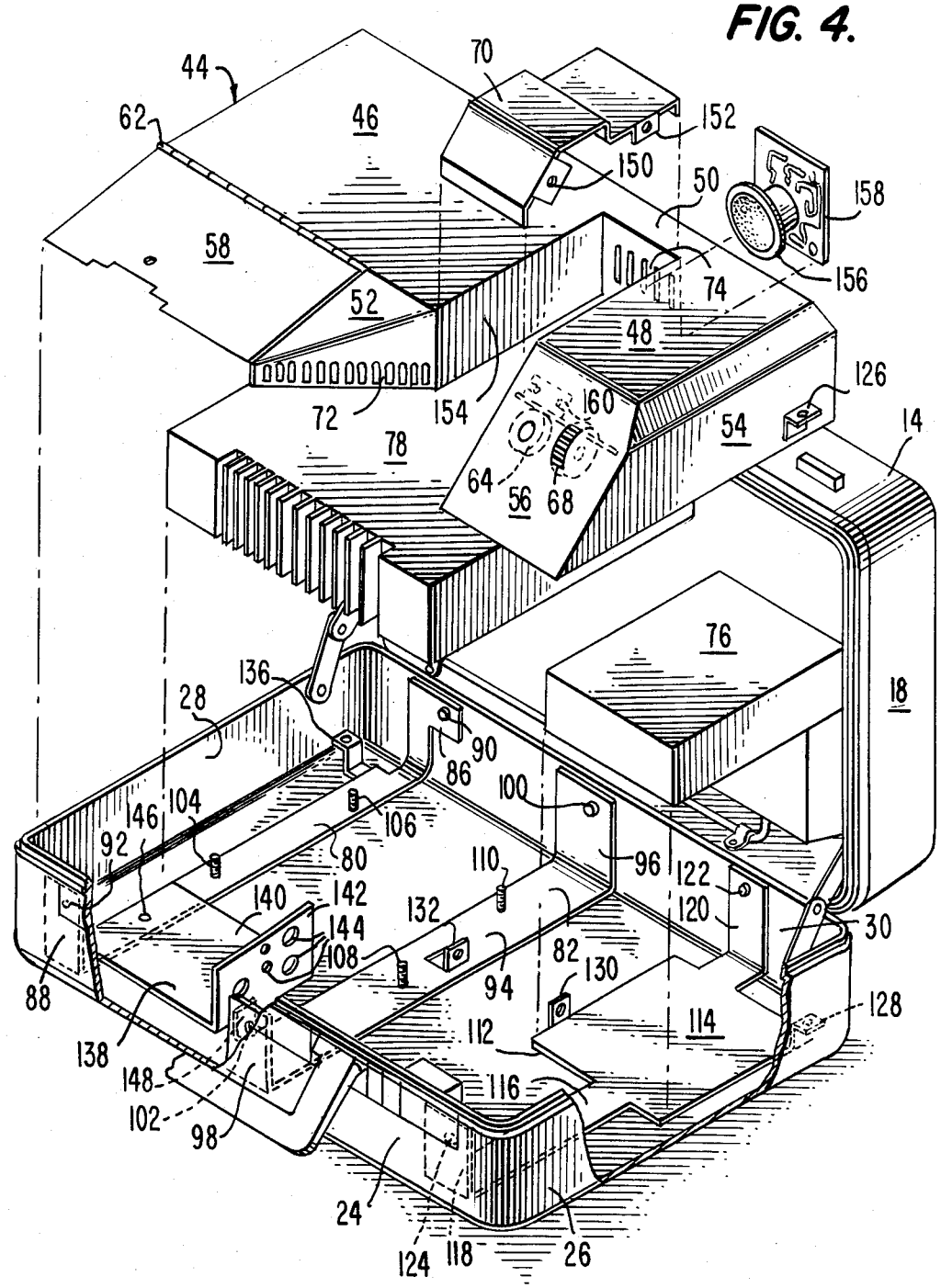
FIG. 4 is an exploded perspective view of the carrying case showing the positioning of its various components.

Referring to FIGS. 1, 3 and 4, the present invention contemplates the use of a substantially rectangularly shaped carrying case 10 into which the cellular telephone components are mounted. The carrying case consists of a top cover 12 having a top front wall 14, a top rear wall 16 and two top side walls 18 and 20. The carrying case 10 also includes a bottom body portion 22 consisting of a bottom front wall 24, two bottom side walls 26 and 28 and a bottom rear wall 30. Latches 32 and standard hinges 36 are provided to open and close the carrying case 10 and a handle 34 is included to facilitate the portability of the carrying case 10. Although the present invention has been designed to utilize a Zero Halliburton carrying case model ZH-104 having dimensions of 13"×18" and 3⅜", any similarly designed carrying case, attache case, briefcase, suitcase or the like can be utilized. Additionally, please note that although not essential for the practice of the present invention, the exterior surfaces of the carrying case described hereinabove are constructed of durable, lightweight aluminum.

When opened, as shown in FIG. 3, the top interior portion 21 of the carrying case 10 is provided with various compartments 38 and 40 into which a plurality of different items such as pads 42 can be placed. The majority of the interior of the bottom body portion 22 is concealed by an interior cover plate 44. This cover consists of rectangular planar portions 46 and 48 connected by a bridging portion 50. Adjacent to the rectangular planar portion 46 is a movable cover portion 58 and a triangular portion 52. A side portion 54 and an angled portion 56 are provided adjacent to the rectangular planar portion 48. A telephone handset 68, which rests upon a cradle support 70, is provided between the planar portions 46 and 48, as well as the triangular portion 52 and the angled portion 56. A key operated ON/OFF switch 64 as well as a volume control 66 are provided on the angular portion 56 which are used to control the operation of the cellular telephone unit. The movable portion 58 is adapted to move utilizing a hinge 62. A handle 60 is attached to the movable portion 58 of the cover 44 to facilitate access to various indicators and fuses provided in the interior of the carrying case. These indicators would include a monitor which indicates that the battery is at a low level and must be charged. Although not of crucial importance to the present invention, the cover plate 44 and the cradle support 70 are constructed of a lightweight, durable metal material. Additionally, for aesthetic purposes, the cover plate 44 could be covered by Italian leather or similar material.

As shown in more detail in FIG. 4, the covering plate 44 is provided with a plurality of cooling fins 72 utilized to facilitate the cooling of the electronic circuitry provided within the interior of the carrying case. Additionally, although not shown, please note that additional cooling fins are provided along the entire back wall of the covering plate 44. As shown in FIG. 4, the purpose of the covering plate 44 is to protect and conceal from view a battery 76 and battery charger 158 and transceiver 78 which are essential components in the cellular telephone unit. Although not crucial to the present invention, the carrying case was designed to utilize a cellular telephone unit manufactured by the NEC Corporation. This unit includes Transceiver Model TR5E800-2B and Handset EZ970.

The transceiver 78 is fixedly mounted within the bottom body portion 22 using specially designed mounting brackets 80 and 82. Support bracket 80 consists of a longitudinal strut 84 extending between the bottom front wall 24 and the bottom rear wall 30 of the bottom body portion 22. A first flange portion 86 is provided at virtually a right angle with respect to the longitudinal strut 84 along the bottom rear wall 30, and a second flange portion 88 having a right angle with respect to the longitudinal strut 84 is provided adjacent to the bottom front wall 24. Rivets, screws or similar mounting devices 90, 92 are used to mount and affix the flanges 86 and 88 to the bottom rear wall 30 and bottom front wall 24. respectively.

Similar to mounting bracket 80, mounting bracket 82 is provided with a longitudinal strut 94 extending between the bottom front wall 24 and the bottom rear wall 30. A flange portion 96 extends from the longitudinal strut 94 at approximately a right angle adjacent to the bottom rear wall 30. Flange portion 98 similarly extends at a right angle from the longitudinal strut 94 along the bottom front wall 24. Mounting devices 100 and 102 consisting of screws, rivets or similar apparatuses positively affix the bracket 82 to the bottom rear wall 30 and the bottom front wall 24.

Studs 104 and 106 provided on the longitudinal strut 84 of bracket 80, and studs 108 and 110 provided on the longitudinal strut 94 of bracket 82 are used to anchor the transceiver bracket and transceiver 78 in place utilizing screw fasteners or similar devices.

The battery 76 is mounted within the carrying case utilizing a mounting bracket 112 which extends between the bottom front wall 24 and the bottom rear wall 30. This bracket consists of a rectangular planar portion 114 designed to have the same outer configuration of the battery 76. A longitudinal strut 116 extends from this planar portion 114 to the bottom front wall 24. A flange 118 is provided at right angles from the longitudinal strut 116 along the surface of the bottom front wall 24. A flange 120 extends from the rectangular planar portion 114 and includes a portion which is substantially at right angles to the portion 114 and extends along the bottom rear wall 30. Mounting means such as screws, rivets or the like 122, 124 are used to positively affix the mounting bracket 112 to the front and rear walls of the carrying case. The battery and battery charger 76 is physically mounted on the rectangular planar portion 114 in a manner similar to the mounting of the transceiver 78. Alternatively, the battery 76 can be mounted to the mounting bracket 112 utilizing a clamp, or VEL- CRO and duct tape. Although not crucial to this invention, brackets 80, 82 and 112 are constituted of a lightweight, durable metal material.

The cover plate 44 was designed to conceal the battery and battery charger 76 and the transceiver 78 from view. This cover is secured within the interior of the carrying case utilizing mounting brackets 128, 130, 132, and 136 by employing screws, rivets or similar devices. A mounting bracket 126 connected to the cover plate 44 is aligned and secured to mounting plate 128. A similar mounting bracket (not shown) is aligned with bracket 136.

A bracket 138 is provided directly under the movable portion 58 of the cover 44. This bracket consists of a planar portion 140 which extends along and is proximate to the bottom front wall 24. A planar portion 142 is provided at right angles from the portion 140. Planar portion 142 contains a plurality of apertures 144 which are utilized to hold a number of fuses or indicators such as an indicator denoting when the power of the battery 76 is low and needs to be recharged. Additionally, a DC power cord can be provided thereon. Mounting bracket 138 is positively affixed to mounting bracket 80 through the use of a screw, rivet or similar means 146 and to mounting bracket 82 through the use of a suitable mounting means provided on flange 148 connected to the longitudinal strut 116 of bracket 82.

The cradle support 70 which is used as a support for the handset 68 contains two flanges 150 and 152 which are used to affix the cradle support 70 to the cover plate 44 in proximity to the rectangular planar portion 48. Two additional brackets, not shown, are provided on the bracket 70 opposite to the brackets 150, 152 and are affixed to side section 154 of the cover plate 44. Alternatively, the two side flanges 150 and 152 can be eliminated and a first additional flange can be added to the front of the bracket 70 and a second additional flange can be added to the rear of the bracket 70. The rear flange is adapted to slide under the bridging portion 50 to hold the bracket 70 in place. A VELCRO strap can be used to hold the front flange in place.

A speaker 156 is directly affixed to the speaker fins 74 provided on the portion 50 of cover plate 44. The battery charger 158 is provided on a circuit board and is affixed to this portion 50 directly to the rear of the speaker 156. This circuit board is used to charge the battery 76. Speaker 156 is employed to allow the individual operator of the cellular telephone unit to monitor the status of incoming telephone calls without the necessity of lifting the handset 68 from its mounting cradle support 70.

Figure 5:
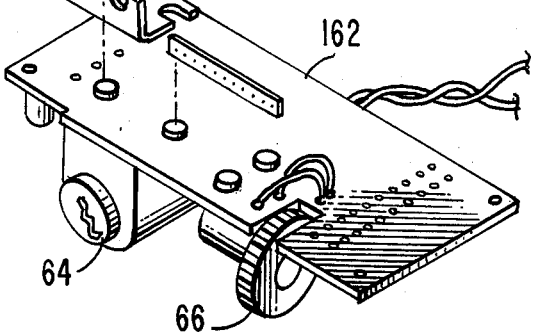
FIG. 5 is a perspective view of the circuit board shown in phantom in FIG. 4 controlling the operation of the cellular telephone handset.

As shown in phantom in FIG. 4 and in greater detail in FIG. 5, the operation of the cellular telephone unit is, in part, controlled by the key ON/OFF switch 64 and volume control 66. These two controls are mounted upon a circuit board 162 which is provided behind the angular portion 56 of the cover plate 44. A bracket 160 is utilized to secure the circuit board 162 in its correct position. As shown in phantom in FIG. 4, the bracket 160 is positively affixed to the rear portion of the angular portion 56.

Figure 2:
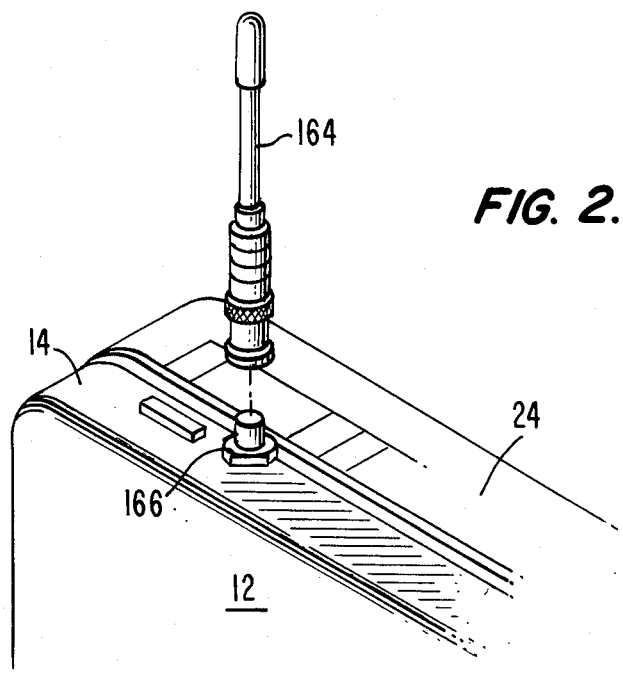
FIG. 2 is a perspective view of the carrying case detailing the connection of the antenna to the exterior of the case.

As shown in FIG. 2, an antenna 164 is removably attached to the outer top front wall 14 of the carrying case 10. An aperture is provided in this top front wall and a BNC antenna mount 166 is provided therein. A flexible unity gain antenna 164 is removably attached to this antenna mount 166. The antenna 164 is connected to the transceiver 78 utilizing a standard connector cable 168. The telephone handset 68 provided upon the cradle support 70 is connected to the battery 76 and in turn connected to the transceiver 78 by a cord, not shown. Access to the battery 76 is provided by an aperture cut in the side adjacent to the angular portion 56.

In operation, the carrying case including the cellular telephone unit is completely portable and can accompany the individual user in his travels. Similar to the conventional permanently mounted cellular telephone units, this particular unit can be utilized in the individual's automobile, but need not remain there for safety and convenience sake.

Although the invention has been shown in connection with a preferred embodiment, it will be readily apparent to those skilled in the art that various changes in form and arrangement of parts may be made to suit various requirements without departing from the spirit and scope of the invention.

What is claimed is:

1. A carrying case adapted to carry therewithin a cellular telephone unit including a transceiver, a battery and a telephone handset comprising:
   immobile, rigid mounting and supporting means fixedly attached to the interior of the carrying case for mounting and supporting the transceiver and the battery, said immobile, rigid mounting and supporting means adapted to positively secure the transceiver and the battery directly thereto.

2. The carrying case in accordance with claim 1 wherein said immobile mounting and supporting means consists of first and second brackets for mounting and supporting the transceiver, and a third bracket for mounting and supporting the battery, each of said brackets traversing the interior width of the carrying case.

3. The carrying case in accordance with claim 2 wherein each of said first and second brackets contain a plurality of attaching means thereon for positively engaging the transceiver.

4. The carrying case in accordance with claim 1 further including a covering means fixedly secured in the interior of the case for concealing the transceiver and battery from view.

5. The carrying case in accordance with claim 4 wherein said covering means is attached to said immobile mounting and supporting means 6. The carrying case in accordance with claim 4 wherein a portion of said covering means is hinged for movement, thereby allowing accessibility to an area of the case enclosed by said covering means.

7. The carrying case in accordance with claim 6 further including a fourth bracket attached to said immobile mounting and supporting means and provided underneath said hinged portion of said covering means, said fourth bracket adapted to mount at least one indicator light.

8. The carrying case in accordance with claim 4 further including a cradle support attached to said covering means for supporting the telephone handset.

9. A carrying case adapted to carry therewithin a cellular telephone unit including a transceiver, a battery and a telephone handset comprising:
   a covering means fixedly secured in the interior of the case for concealing the transceiver and battery from view.

10. The carrying case in accordance with claim 9 further including an immobile mounting and supporting means fixedly attached to the interior of the carrying case for mounting and supporting the transceiver and the battery, said immobile mounting and supporting means adapted to positively secure the transceiver and the battery directly thereto, said immobile mounting and supporting means attached to said covering means and said immobile mounting and supporting means consisting of first and second brackets for mounting and supporting the transceiver, and a third bracket for mounting and supporting the battery, each of said brackets traversing the interior width of the carrying case.

11. The carrying case in accordance with claim 10 wherein each of said first and second brackets contain a plurality of attaching means for positively engaging the transceiver.

12. The carrying case in accordance with claim 9 further including a cradle support attached to said covering means for supporting the handset.

* * * * *